Feb. 5, 1952 M. E. HARDY 2,584,580

MULTISPEED PHONOGRAPH DRIVE

Filed April 22, 1949 2 SHEETS--SHEET 1

MAURICE E. HARDY
*INVENTOR.*

BY [signature]

HIS AGENT

Feb. 5, 1952 | M. E. HARDY | 2,584,580

MULTISPEED PHONOGRAPH DRIVE

Filed April 22, 1949 | 2 SHEETS—SHEET 2

MAURICE E. HARDY
*INVENTOR.*

BY [signature]

HIS AGENT

Patented Feb. 5, 1952

2,584,580

UNITED STATES PATENT OFFICE 2,584,580

MULTISPEED PHONOGRAPH DRIVE

Maurice E. Hardy, Chicago, Ill., assignor to Zenith Radio Corporation, a corporation of Illinois Application April 22, 1949, Serial No. 89,055

4 Claims. (Cl. 74—200)

This invention relates to an improved driving system for a turntable and, more particularly, to such a driving system adapted to rotate a turntable at a selected one of a plurality of predetermined speeds.

Turntable driving systems for the selected turntable speeds of 78 R. P. M. and 33⅓ R. P. M. have long been known in the art of radio broadcasting where reproduction of both the standard 78 R. P. M. recordings, available to the general public, and the 33⅓ R. P. M. transcription type of recordings, produced exclusively for the broadcasters is required. These systems, which have been designed specifically for use in the broadcasting industry, are generally complex and entail great expense inasmuch as the constancy of rotation and freedom from extraneous vibrations must be maintained within very high standards of performance. Such systems are not readily adapted for manufacture and sale to the general public, as a result of the great expense involved in production.

In addition to the standard recordings on which the information has been impressed for reproduction at a rotational speed of 78 R. P. M., certain record manufacturers have designed and produced recordings for reproduction at the speed of 33⅓ R. P. M. and at the speed of 45 R. P. M. Thus, it is apparent that there exists a need for a driving system for a turntable wherein the turntable may be driven at a selected rotational speed of 78 R. P. M., 45 R. P. M. or 33⅓ R. P. M. in order to accommodate each of the three varieties of recordings. Such a system must provide constant speed of rotation, afford freedom from extraneous vibrations such as rumble, and yet be inexpensive to construct in order to meet the demands of the general public.

Therefore, it is an object of this invention to provide a turntable driving system operable at a selected one of a plurality of driving speeds, affording constant speed of rotation at each of the selected speeds and which is free from extraneous vibrational defects.

It is a further object of this invention to provide an improved turntable driving system which is selectively operable at 33⅓ R. P. M., 45 R. P. M. and 78 R. P. M.

A still further object of this invention is to provide a turntable driving system for one of a plurality of predetermined speeds which is comprised of a minimum of simple component elements and is, therefore, inexpensive to construct, although high standards of performance are maintained.

In accordance with the invention the driving system for a turntable comprises an elongated driving element, a gear family including gears of different diameters rotatably mounted in axial alignment along an axis parallel to the axis of the driving element, and a driven gear in mechanical driving relationship with the gear family. The driven gear is rotated from the gear family and actuates a turntable. There is provided a displaceable gear to selectively complete a driving connection between the driving element and a selected one of the gears of the gear family. Thus, the driven gear is rotated at a speed determined by the selected member of the gear family. The driving system further includes a selector system comprising a carriage for the displaceable gear, movable pivotally and longitudinally with respect to an axis parallel to the axis of the driving element, a first spring mechanically biasing the carriage along its axis, a cam track having a plurality of resting surfaces in spaced relationship relative to the planes of the gears in the gear family to maintain the carriage at a selected one of a plurality of positions relative to the planes of the gears of the gear family and in opposition to the bias of the first spring, and means for effecting movement of the cam track to couple the displaceable gear with a selected member of the gear family. A mechanical locking device is provided, and includes a movably mounted control member having a plurality of detents arranged in spaced relationship along a cam portion, a pin positioned on the carriage arranged to correspond with the cam portion, and a second spring mechanically biasing the carriage in a direction to releasably maintain the pin in locking engagement with a selected detent.

The features of the present invention, which are believed to be novel are set out with particularity in the appended claims. The present invention both as to its organization and manner of operation, together with further objects and advantages thereof, may best be understood, however, by reference to the following description taken in connection with the accompanying drawings in which:

Figure 1:
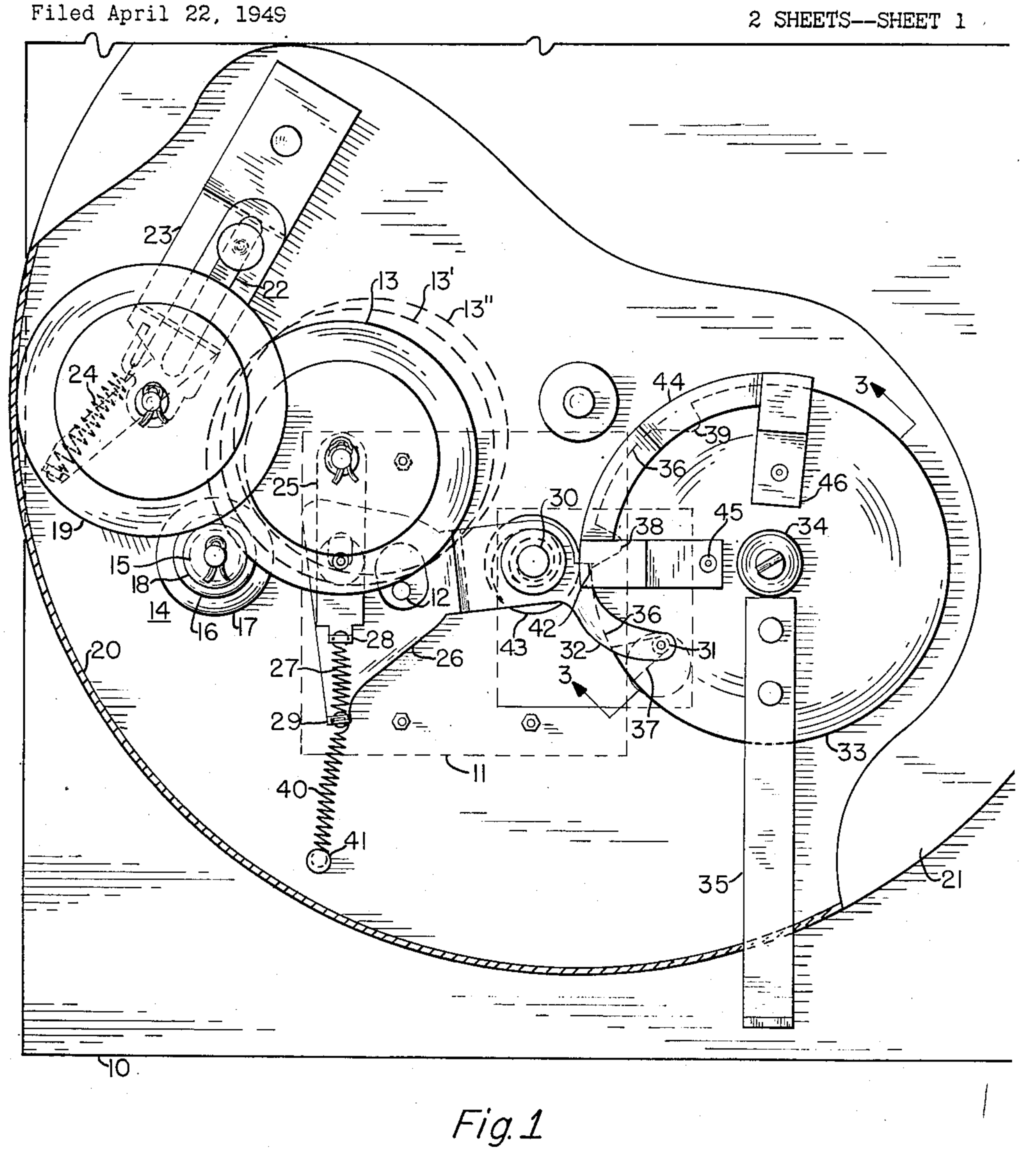
Figure 1 shows a plan view of a portion of a record player including a turntable driving system embodying the present invention, a portion of the turntable being shown cut-away.
Figure 2:
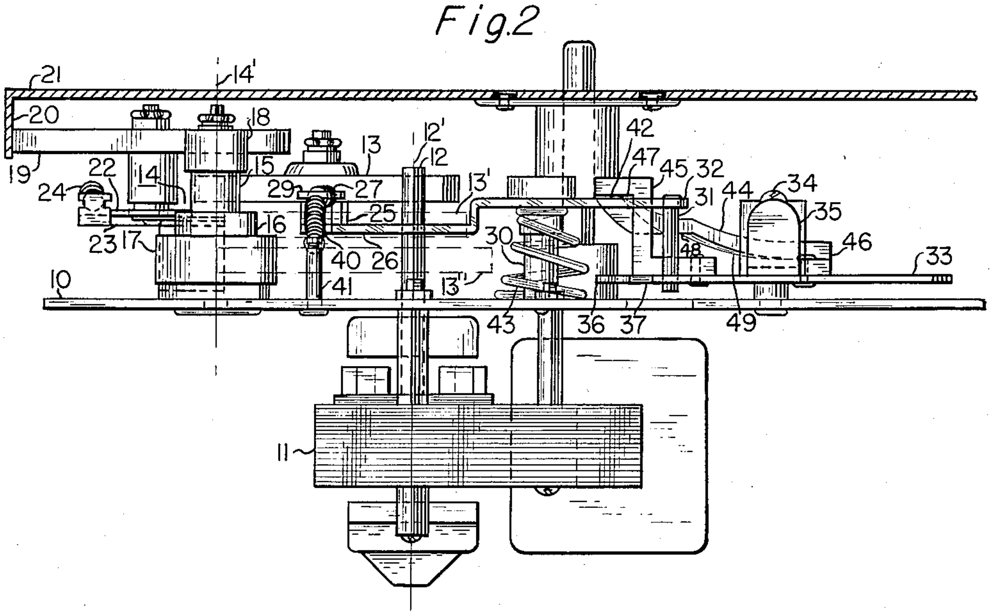
Figure 2 shows a side elevation of a portion of the record player illustrated in Figure 1, the turntable being shown in section.

Referring to Figure 1, the turntable driving system is mounted on a base 10, and includes a driving motor 11 shown in outline, which is coupled to an elongated driving shaft or driving element 12 having an axis 12′ (Figure 2). Driving element 12 is frictionally coupled to a rubber-tired displaceable gear 13, which is in turn frictionally coupled to a selected member of a gear family 14, here shown as a gear 15. Gear family 14 also includes members 16 and 17 having diameters different from member 15 and from each other. The members of gear family 14 (Figure 2) are rotatably mounted in size-ordered relationship along an axis 14′, parallel to the axis 12′ of driving element 12 and are in mechanically fixed driving relationship with each other and with a driven gear 18. Driven gear 18 is frictionally coupled to a rubber-tired idler gear 19 which in turn is frictionally coupled to a rim 20 of a turntable 21 to actuate the turntable from the driven gear. The driving connection between the motor 11 and the turntable 21 is thereby completed.

Idler gear 19 is rotatably mounted on a movable member 22 which in turn is mounted for rotational and reciprocal movement in a horizontal plane on a support 23. A spring 24 mechanically biases member 22 in a direction to maintain idler gear 19 in frictional driving engagement with both driven gear 18 and rim 20 of turntable 21. Displaceable gear 13 is rotatably mounted on a member 25 which in turn is mounted for rotational and reciprocal movement in a horizontal plane on a carriage 26. A spring 27, which is connected between a projection 28 positioned on member 25 and a projection 29 positioned on carriage 26, mechanically biases member 25 in a direction frictionally to engage displaceable gear 13 with both driving element 12 and the selected member of gear family 14. Carriage 26 is mounted for rotational and longitudinal movement on an elongated pivot shaft 30 (Figure 2) and includes a depending pin 31 positioned on an arm 32 extending therefrom. A control member 33 is rotatably mounted about an axis parallel to axis 12′ at its central portion 34 and includes a control lever 35 and an arcuately-shaped cam surface 36 having detents 37, 38 and 39. A spring 40, attached between projection 29 of carriage 26 and a tie-point 41, mechanically biases the carriage about pivot point 30 in a counterclockwise direction and maintains pin 31 in releasable engagement with a selected one of detents 37, 38 or 39. Pin 31 is shown to be in engagement with detent 37.

Figure 3:
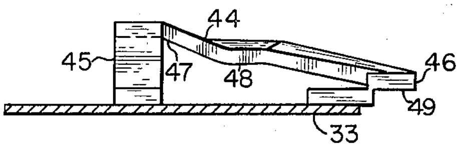
Figure 3 shows a sectional view taken along line 3—3 of Figure 1.

Referring now to Figure 2, identical elements shown both in Figure 2, as well as in Figure 1, are identified by identical reference numerals. Carriage 26 includes a cam bearing surface 42 and is mechanically biased longitudinally along pivot shaft 30, in a direction toward turntable 21, by means of a spring 43. A cam track 44 is mounted by means of supports 45 and 46 on control member 33. Cam track 44 includes resting surfaces 47, 48 and 49 which are positioned in spaced relationship relative to the respective planes of the gears 15, 16 and 17 of gear family 14. Each of cams 47, 48 and 49 is cooperatively arranged to selectively bear against cam bearing surface 42. Thus, carriage 26 is maintained at a selected longitudinal position along shaft 30 determined by which of the cams 47, 48 or 49 bears against the cam bearing surface 42. Figure 3 shows, more clearly, the configuration of cam track 44.

Assume now that control lever 35 is displaced manually from the position shown in Figure 1 and in a direction which provides counterclockwise movement of control member 33. Pin 31 is forced out of engagement with detent 37 and causes carriage 26 to rotate about pivot 30. This initial movement of carriage 26 carries displaceable gear 13 out of engagement with driving element 12 and gear 15. The disengagement is such that the rim of displaceable gear 13 is carried beyond the rim of gear 17 (the gear of greatest diameter) of gear family 14. Control member 33 carries the cam track 44 and in the initial movement thereof, resting surface 47 rides along cam bearing surface 42. Resting surface 47 is of a sufficient length to allow displaceable gear 13 to clear gear 17 before any longitudinal movement of carriage 26 is effected. With continued rotation of control member 33, pin 31 rides along cam surface 36 and displaceable gear 13 is maintained out of engagement with the gear family 14 and the driving element 12. Simultaneously cam track 44, which bears against cam bearing surface 42, depresses carriage 26 against the bias of spring 43 until resting surface 48 engages cam bearing surface 42. Resting surface 48 then rides along cam bearing surface 42 until pin 31 engages detent 38 and displaceable gear 13 is engaged with driving element 12 and gear family 14. Carriage 26 is now positioned such that displaceable gear 13 is in frictional driving engagement with driving element 12 and gear 16 of gear family 14. This is shown by the dotted position for gear 13 indicated as 13′. With another counterclockwise rotational movement of control member 33 an action similar to that described above is effected. Displaceable gear 13 is carried out of engagement with gear 16 and driving element 12, carriage 26 is further depressed until surface 49 bears against cam bearing surface 42, pin 31 is placed into engagement with detent 39 and gear 13 is coupled between driving element 12 and gear 17 as shown by its dotted position 13″. A similar action is again effected by clockwise rotation of control member 33, from its last-mentioned position wherein pin 31 is selectively engaged with either detent 38 or detent 37 and carriage 26 is selectively positioned by cam bearing surface 42 bearing against either resting surface 48 or resting surface 47. It should be noted that at each of the selected positions of the control member 33 and of the carriage 26, the mechanical bias of spring 40 releasably locks pin 31 with the selected one of detents 37, 38 or 39, and the mechanical bias of spring 43 releasably locks cam bearing surface 42 with the selected respective one of resting surfaces 47, 48 or 49.

It is apparent that by constructing the various elements of the driving system in certain predetermined diametered-relationships, turntable 21 may be rotated at any selected one of predetermined rotational speeds by the selection of a member of the gear family 14 which has the proper relationship to the required speed of rotation. Although gear family 14 is shown as including three members having different diameters, it is clearly within the scope of this invention to add gears of different diameters with additional resting surfaces in cam track 44 and with additional detents in cam surface 36 thereby to provide a system wherein rotation of a turntable may be established for a plurality of predetermined speeds, greater than three. Also, the system is adaptable for two speed operation, by the elimination of one member of the gear family 14, one resting surface of the cam track 44, and one detent of the cam surface 36.

Figure 4:
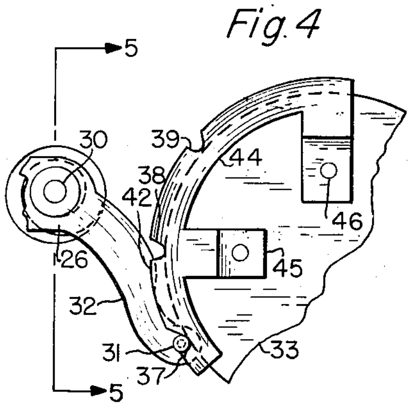
Figure 4 shows a modification of several of the elements shown in Figure 1, portions of the elements being shown broken away.
Figure 5:
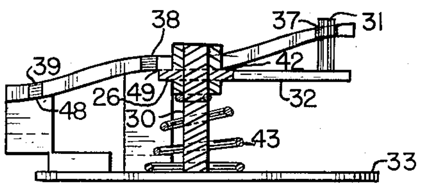
Figure 5 shows a sectional view taken along line 5—5 of Figure 4.

Figure 4 shows a modified cam arrangement and similarly operative elements are identically numbered to the equivalent elements shown in Figures 1 and 2. As compared with the embodiment shown in Figures 1 and 2, instead of cam surface 36 and detents 37, 38 and 39 being positioned directly on control member 33, these elements are positioned along the edge of cam track 44. The same manner of locking control member 33 is achieved, by extending cam track 44, to a position in the vicinity of pin 31, at which point a detent 37 is located. In addition to detent 37, detents 38 and 39 are positioned along the arcuate peripheral edge of cam track 44. Pin 31 is upstanding, rather than depending, and is engageable with each of detents 37, 38 and 39. Thus, detents need not be positioned on control member 33 proper. Figure 5, showing a selectional view of cam track 44 and arm 32 of carriage 26, more clearly illustrates the manner of cooperation of upstanding pin 31 with detents 37, 38 and 39. The operation of cam bearing surface 42 with resting surfaces 47, 48 and 49 of cam track 44 is exactly as described in connection with Figures 1 and 2, and the operation of the remainder of the system is the same as aforedescribed.

It is entirely within the contemplation of this invention to construct control member 33 for linear movement as compared with rotational movement therefor, as described above. In this embodiment, cam surface 36 and cam track 44 have a linear configuration, are adapted for linear movement and operate on carriage 26 in the same manner as described in connection with these elements having an arcuate configuration and adapted for rotational movement.

The driving system which has been illustrated and described is easily manufactured, being comprised of easily fabricated and quickly assembled component elements. Such a system is readily subject to mass production techniques, and therefore, inexpensive to construct. Also, since the transfer of rotation from the driving element to a selected member of the gear family and from the driving element to the rim of the turntable is established, in each case, through the peripheral rim of a rubber tired gear, eccentricities in such rubber-tired gears are of minimum importance and thus vibrational defects therefrom are minimized. This is in contrast to a system wherein transfer of rotation is established onto the peripheral rim of a rubber-tired gear and further transferred from a section of another diameter on the same gear. And too, since the drive between the driving element and the rim of the turntable is completed through two rubber-tired gears, rather than one, the insulation value is doubly increased with respect to the transfer of objectionable vibrational movement from the driving element to the rim of the turntable. Therefore, it may be seen that the arrangement provides a turntable driving system which maintains high standards of operation at a selected one of a plurality of driving speeds and which is inexpensive to construct.

While particular embodiments of the invention have been shown and described it is apparent that changes and modifications may be made without departing from this invention in its broader aspects and, therefore, the aim in the appended claims is to cover such changes and modifications as fall within the true spirit and scope of this invention.

I claim:

1. A driving system for a turntable comprising: an elongated driving element; a gear family including gears of different diameters rotatably mounted in axial alignment along an axis parallel to the axis of said driving element; a driven gear in mechanical driving relationship with said gear family to be rotated therefrom to actuate a turntable; a displaceable gear for selectively completing a driving connection between said driving element and a selected one of the gears of said gear family to rotate said driven gear at a speed determined by the selected member of said gear family; a selector system including a carriage for said displaceable gear, movable pivotally and longitudinally with respect to an axis parallel to the axis of said driving element, a first spring mechanically biasing said carriage in a direction along its axis, a cam track having a plurality of resting surfaces in spaced relationship relative to the planes of said gears in said gear family to maintain said carriage at a selected one of a plurality of positions relative to said planes and in opposition to the bias of said first spring, and means for effecting movement of said cam track to couple said displaceable gear with a selected member of said gear family; and a mechanical locking device including a movably mounted control member having a plurality of detents arranged in spaced relationship along a cam portion, a pin positioned on said carriage and arranged to cooperate with said cam portion, and a second spring mechanically biasing said carriage in a direction to releasably maintain said pin in locked engagement with a selected one of said detents.

2. A driving system for a turntable comprising: an elongated driving element; a gear family including three parallel gears of different diameters rotatably mounted in mechanically fixed driving relationship, in axial alignment and size-ordered relationship along an axis parallel to the axis of said driving element; a driven gear in mechanical driving relationship with said gear family; a displaceable gear for selectively completing a driving connection between said driving element and a selected one of the gears of said gear family to rotate said driven gear at a speed determined by the selected member of said gear family; a first spring mechanically biasing said displaceable gear in a direction to releasably maintain said displaceable gear in firm driving engagement with both said driving element and a selected member of said gear family; a selector system including a carriage for said displaceable gear, movable pivotally and longitudinally with respect to an axis parallel to the axis of said driving element, a second spring mechanically biasing said carriage in a direction along its axis, and a cam track having a plurality of resting surfaces in spaced relationship relative to the planes of said gears in said gear family to maintain said carriage at a selected one of a plurality of positions relative to said planes and in opposition to the bias of said second spring; and a mechanical locking device including a pivotally mounted control member having said cam track mounted thereon and having a plurality of detents arranged in spaced relationship along an arcuately shaped cam portion, a pin positioned on said carriage and arranged to cooperate with said cam portion, a third spring mechanically biasing said carriage in a direction to releasably maintain said pin in locked engagement with a selected one of said detents, and means for effecting movement of said control member.

3. In a driving mechanism for a turntable, a selector system for selectively positioning a displaceable gear in driving engagement with one of the members of a stepped gear family comprising: a carriage for said displaceable gear movable pivotally and longitudinally with respect to an axis parallel to that of said gear family and including a detent; a first spring biasing said carriage in a direction along its axis; a first cam track engaging said carriage and having a plurality of resting surfaces in spaced longitudinal relation corresponding to the planes of said members of said gear family to maintain said carriage at one of a plurality of positions relative to said planes and in opposition to the bias of said first spring; a second spring biasing said carriage pivotally about its axis to urge said displaceable gear into engagement with said gear family; a second cam track for pivoting said carriage against the bias of said second spring and having a plurality of detents spaced therealong to cooperate with said detent of said carriage when any of said resting surfaces of said first cam track engages said carriage; and means for simultaneously moving said first and second cam tracks to displace said displaceable gear with respect to said gear family.

4. In a driving mechanism for a turntable, a selector system for selectively positioning a displaceable gear in driving engagement with one of the members of a stepped gear family comprising: a carriage for said displaceable gear movable pivotally and longitudinally with respect to an axis parallel to that of said gear family and including a detent; a first spring biasing said carriage in a direction along its axis; a control member including a first cam track engaging said carriage and having one series of stepped surfaces providing a plurality of resting positions in spaced longitudinal relation corresponding to the planes of said members of said gear family to maintain said carriage at one of a plurality of positions relative to said planes and in opposition to the bias of said first spring; a second cam track included in said control member for pivoting said carriage to withdraw said displaceable gear from said gear family and having a plurality of detents spaced therealong to receive said detent of said carriage when any of said resting surfaces of said first cam track engages said carriage; a second spring biasing said carriage pivotally about its axis to urge said displaceable gear into engagement with said gear family; and means for simultaneously moving said first and second cam tracks to displace said displaceable gear with respect to said gear family.

MAURICE E. HARDY.

REFERENCES CITED

The following references are of record in the file of this patent:

UNITED STATES PATENTS

| Number | Name | Date |
|---|---|---|
| 125,677 | Heckert | Apr. 16, 1872 |
| 2,248,384 | Redin | July 8, 1941 |
| 2,260,319 | Hoehn | Oct. 28, 1941 |
| 2,281,665 | Brady | May 5, 1942 |
| 2,438,265 | Metzner | Mar. 23, 1948 |